United States Patent
Bryan et al.

(10) Patent No.: US 11,520,675 B2
(45) Date of Patent: Dec. 6, 2022

(54) ACCELERATED REPLAY OF COMPUTER SYSTEM CONFIGURATION SEQUENCES

(71) Applicant: EMC IP Holding Company LLC, Hopkinton, MA (US)

(72) Inventors: Matthew Bryan, Olympia, WA (US); Shiv Shankar Kumar, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 161 days.

(21) Appl. No.: 17/078,885

(22) Filed: Oct. 23, 2020

(65) Prior Publication Data

US 2022/0129360 A1    Apr. 28, 2022

(51) Int. Cl.
| | |
|---|---|
| *G06F 11/00* | (2006.01) |
| *G06F 11/30* | (2006.01) |
| *G06F 8/61* | (2018.01) |
| *G06F 9/445* | (2018.01) |

(52) U.S. Cl.
CPC ............ *G06F 11/3051* (2013.01); *G06F 8/61* (2013.01); *G06F 9/44505* (2013.01); *G06F 11/302* (2013.01); *G06F 11/3075* (2013.01); *G06F 11/3079* (2013.01)

(58) Field of Classification Search
CPC ............. G06F 11/2097; G06F 11/0727; G06F 11/2033; G06F 11/2038; G06F 11/3006; G06F 11/3051; G06F 11/302; G06F 11/3075; G06F 11/3079
See application file for complete search history.

(56) References Cited

U.S. PATENT DOCUMENTS

| | | | |
|---|---|---|---|
| 6,748,429 B1 * | 6/2004 | Talluri | H04L 69/40 709/221 |
| 7,478,385 B2 | 1/2009 | Sierer et al. | |
| 7,865,888 B1 | 1/2011 | Qureshi et al. | |
| 8,418,150 B2 * | 4/2013 | Thirumalai | G06F 16/2365 717/124 |
| 8,533,704 B2 | 9/2013 | Wookey | |

(Continued)

OTHER PUBLICATIONS

Non-Final Office Action received for U.S. Appl. No. 17/074,019 dated Feb. 17, 2022, 24 pages.

(Continued)

*Primary Examiner* — Charles Ehne
(74) *Attorney, Agent, or Firm* — Amin, Turocy & Watson, LLP

(57) ABSTRACT

Systems and methods facilitating automated mocking of computer system deployments are described herein. A method as described herein can include associating, by a first system operatively coupled to a processor, respective properties of a first deployment of a second system on a first computing device with respective automation mapping functions; executing, by the first system, the automation mapping functions in an order defined by dependencies between respective ones of the automation mapping functions, resulting in a series of system modeling tasks and an order associated with the series of system modeling tasks; and performing, by the first system, the series of system modeling tasks in the order associated therewith, resulting in a second deployment of the second system being created on a second computing device that is distinct from the first computing device.

20 Claims, 10 Drawing Sheets

(56) References Cited

U.S. PATENT DOCUMENTS

| | | | |
|---|---|---|---|
| 8,819,673 | B1 | 8/2014 | Wilkinson et al. |
| 9,477,454 | B2 | 10/2016 | Scheiner et al. |
| 10,031,783 | B2 | 7/2018 | Jalagam et al. |
| 10,467,059 | B2 | 11/2019 | Derler et al. |
| 10,579,966 | B1 | 3/2020 | Willson et al. |
| 2005/0289228 | A1* | 12/2005 | Srikanth ............ H04L 41/0866 709/220 |
| 2006/0020908 | A1 | 1/2006 | Jain et al. |
| 2007/0118560 | A1 | 5/2007 | Bomhoevd et al. |
| 2009/0063225 | A1 | 3/2009 | Baeyens et al. |
| 2010/0064035 | A1 | 3/2010 | Branca et al. |
| 2011/0047527 | A1 | 2/2011 | Bird et al. |
| 2011/0265081 | A1 | 10/2011 | Lucovsky et al. |
| 2012/0117560 | A1 | 5/2012 | Vorthmann et al. |
| 2012/0144044 | A1 | 6/2012 | Verma |
| 2016/0239280 | A1 | 8/2016 | Scheiner et al. |
| 2018/0039486 | A1 | 2/2018 | Kulkarni et al. |
| 2019/0036765 | A1* | 1/2019 | Ghosal ............... H04L 41/0686 |
| 2019/0294528 | A1 | 9/2019 | Avisror et al. |
| 2020/0045116 | A1 | 2/2020 | Deodhar et al. |
| 2021/0011840 | A1 | 1/2021 | Zhou |
| 2021/0194803 | A1* | 6/2021 | Zolkover ............... H04L 41/40 |
| 2022/0035733 | A1 | 2/2022 | Zhu et al. |

OTHER PUBLICATIONS

Non-Final Office Action received for U.S. Appl. No. 17/077,742 dated Jun. 24, 2022, 36 pages.

Daniels et al., "Learning the Threshold in Hierarchical Agglomerative Clustering", IEEE 2006, Proceedings of the 5th International Conference on Machine Learning and Applications (ICMLA'06), 2006, 6 pages.

Notice of Allowance received for U.S. Appl. No. 17/074,019 dated Jun. 13, 2022, 27 pages.

Nash et al., "Composition of Mappings Given by Embedded Dependencies", ACM Transactions on Database Systems, vol. 32, No. 1, Mar. 2007, 51 pages.

Siasi et al., "Container-Based Service Function Chain Mapping", 2019 SoutheastCon, Apr. 2019, 6 pages.

Dolstra E., "Integrating Software Construction and Software Deployment", Software Configuration Management (SCM), Springer-Verlag Berlin Heidelberg, 2003, pp. 102-117.

Spillner J., "Transformation of Python Applications into Function-as-a-Service Deployments", arXiv:1705.08169v1, Aug. 20, 2018, 14 pages.

\* cited by examiner

ACCELERATED REPLAY OF COMPUTER SYSTEM CONFIGURATION SEQUENCES

TECHNICAL FIELD

The subject application is related to computer system testing, and more particularly, to techniques for recreating a deployment of a computer system for the purposes of testing.

BACKGROUND

Some computing systems, such as commercial network-attached storage (NAS) systems or the like, can be implemented with a high degree of flexibility and/or scalability in order to better tailor a particular computing system to the needs of a specific customer. For instance, different implementations of a computing system can vary significantly in size (e.g., number of computing devices or clusters, etc.), software features, configurations, users, etc., even within systems of a common computing platform. This potential for significant variation within computing systems of a common platform can, in turn, introduce large amounts of complexity to testing such systems that can render exhaustive system testing practically infeasible, e.g., within a useful or reasonable timeframe.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a system is described herein. The system can include a memory that stores executable components and a processor that executes the executable components stored in the memory. The executable components can include a replay initiation component that reproduces a first configuration of a sequence of configurations associated with a computing system as implemented on a first computing cluster to a second computing cluster that is distinct from the first computing cluster. The executable components can also include a change detection component that identifies a second configuration of the sequence of configurations that exhibits at least a threshold degree of change from the first configuration by traversing the sequence of configurations starting from the first configuration. The executable components can further include a differential replay component that applies a differential between the first configuration and the second configuration to the second computing cluster, resulting in the second computing cluster being configured according to the second configuration.

In another aspect, a method is described herein. The method can include reproducing, by a first system operatively coupled to a processor, a first system configuration of a sequence of system configurations associated with a second system as implemented on a first computing cluster to a second computing cluster that is distinct from the first computing cluster; identifying, by the first system, a second system configuration of the sequence of system configurations that exhibits at least a threshold degree of change from the first system configuration by traversing the sequence of system configurations beginning from the first system configuration; and applying, by the first system, a differential between the first system configuration and the second system configuration to the second computing cluster, resulting in the second computing cluster being configured according to the second system configuration.

In an additional aspect, a non-transitory machine-readable medium including executable instructions is described herein. The instructions, when executed by a processor, can facilitate performance of operations including configuring a first computing cluster according to a first deployment configuration of a series of deployment configurations associated with a computing system as implemented on a second computing cluster that is distinct from the first computing cluster; identifying a second deployment configuration of the sequence of deployment configurations that differs from the first deployment configuration by at least a threshold by traversing the sequence of deployment configurations beginning from the first deployment configuration; and configuring the first computing cluster according to the second deployment configuration by applying a differential between the first deployment configuration and the second deployment configuration to the first computing cluster.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
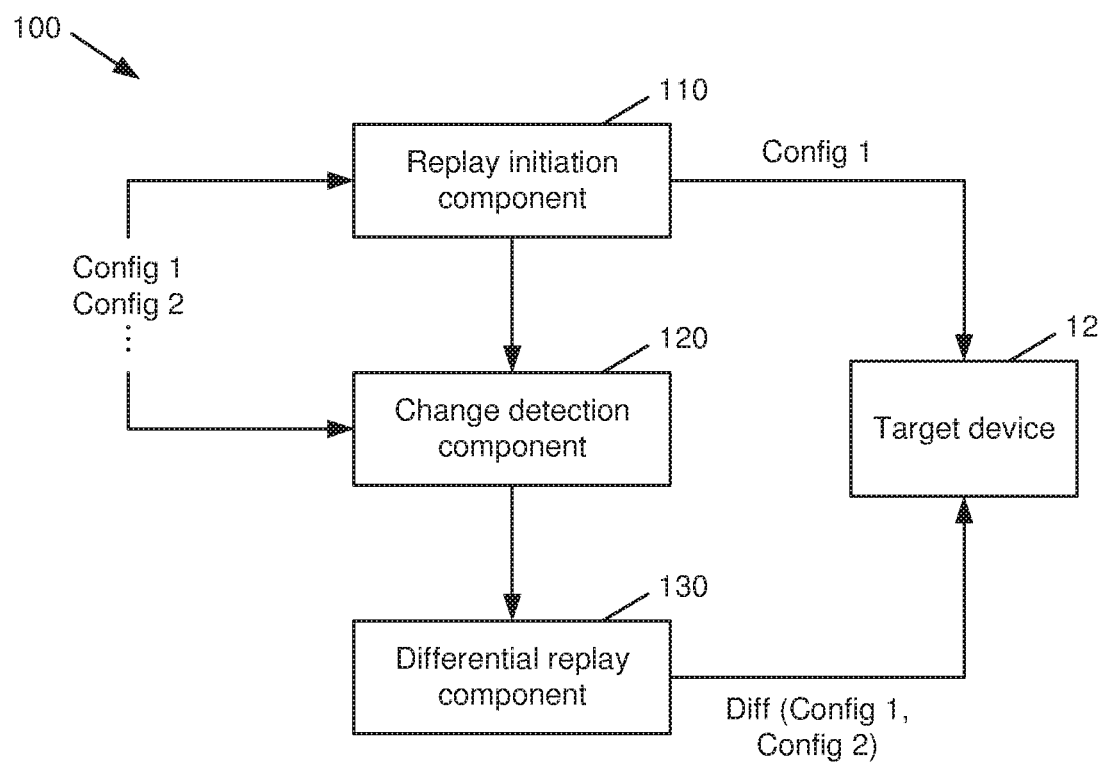
FIG. 1 is a block diagram of a system that facilitates accelerated replay of computer system configuration sequences in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

The present disclosure provides techniques, e.g., as implemented via systems, methods, and/or computer program products, that facilitate the replay of sequences of computing system configurations. As used herein, a "sequence" of configurations is defined with respect to changes in one or more system configuration properties, such as software upgrades and/or patches, software configuration and tunable changes, significant (e.g., as compared to a defined threshold) changes in workload, or the like.

It is often desirable to replay a sequence of computing system configurations, e.g., for the purpose of longevity and/or upgrade testing for the underlying computing system and/or for other purposes. As a real-world example, a given customer that operates a computing cluster for a long period of time (e.g., several years or more) can evolve the use of the computing cluster over that period of time. For instance, software features can be added and/or upgraded, patches and/or other upgrades can be applied, client use of the cluster can change over time (e.g., due to evolution in business practices or other uses of the cluster), etc. This series of changes to the cluster over time can, in turn, increase the likelihood of encountering errors in one or more software features.

Further to the above, it is desirable to test real-world sequences and/or other configuration sequences that are likely to occur in the field, since the combinatorics associated with the entire universe of possible configuration sequences can render testing all possible sequences intractable. Additionally, it is desirable to replay configuration sequences in an accelerated fashion, since the corresponding real-world configuration sequence may have transpired over a longer period than is feasible for testing. For instance, if a configuration sequence encountered in a computing cluster takes place over several years, it is desirable to accelerate that sequence such that testing can be performed in a shorter period, e.g., on the order of days or weeks.

By implementing accelerated replay of configuration sequences as described herein, various advantages that can improve the functionality of a computing system can be realized. These advantages can include, but are not limited to, the following. Usage of computing resources (e.g., power consumption, processor cycles, network bandwidth, etc.) associated with modeling distinct configurations in a configuration sequence can be reduced, e.g., by employing differential modeling. An amount of time associated with creating system test cases from configuration data sequences can be reduced, which can in turn increase the number of tests that can be performed for a given computing platform within a given time, thereby increasing the overall quality of the computing platform. Other advantages are also possible.

With reference now to the drawings, FIG. 1 illustrates a block diagram of a system 100 that facilitates accelerated replay of computer system configuration sequences in accordance with various aspects described herein. As shown in FIG. 1, system 100 includes a replay initiation component 110, a change detection component 120, and a differential replay component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 12.

In an aspect, the components 110, 120, 130 can be associated with a computing node and/or other computing device associated with a computing system. Further, the components 110, 120, 130, and/or other components as will be described in further detail below, can be implemented on a same computing device and/or distributed among multiple computing devices.

Returning to FIG. 1, the replay initiation component 110 of system 100 can reproduce a first configuration of a sequence of configurations of a computing system, e.g., a data storage system or the like as implemented on one or more computing devices (e.g., in a computing cluster) that are remote to system 100, to a target device 12. By way of example, the target device 12 can be a physical device (e.g., a physical computing cluster including one or more computing nodes) or a virtualized device (e.g., a computing cluster simulated in software on one or more physical devices). An example of a mock system site that can be utilized to implement the target device 12 is described in further detail below with respect to FIG. 11.

In an aspect, the series of configurations utilized by the replay initiation component 110 can correspond to respective configuration snapshots or other configuration data that relate to the configuration of a system on a computing device, cluster, site, etc., over a period of time. Techniques that can be utilized to collect a series of configurations are described in further detail below with respect to FIGS. 2-3.

The change detection component 120 of system 100 can identify a second configuration of the sequence of configurations as noted above that exhibits at least a threshold degree of change from the first configuration used by the replay initiation component 110, e.g., by traversing the sequence of configurations starting from the first configuration. An example of a series of configurations that can be processed by the change detection component 120 in this manner is described in further detail below with respect to FIGS. 4-5.

The differential replay component 130 of system 100 can apply a differential to the target device 12 between the first configuration applied to the target device 12 by the replay initiation component 110 and the second configuration identified by the change detection component 120. In an aspect, the differential replay component 130 can calculate and apply a differential (delta) between the two configurations instead of fully applying the second configuration, thereby resulting in the target device 12 being configured according to the second configuration with reduced computing resource utilization as compared to fully applying the second configuration.

Figure 2:
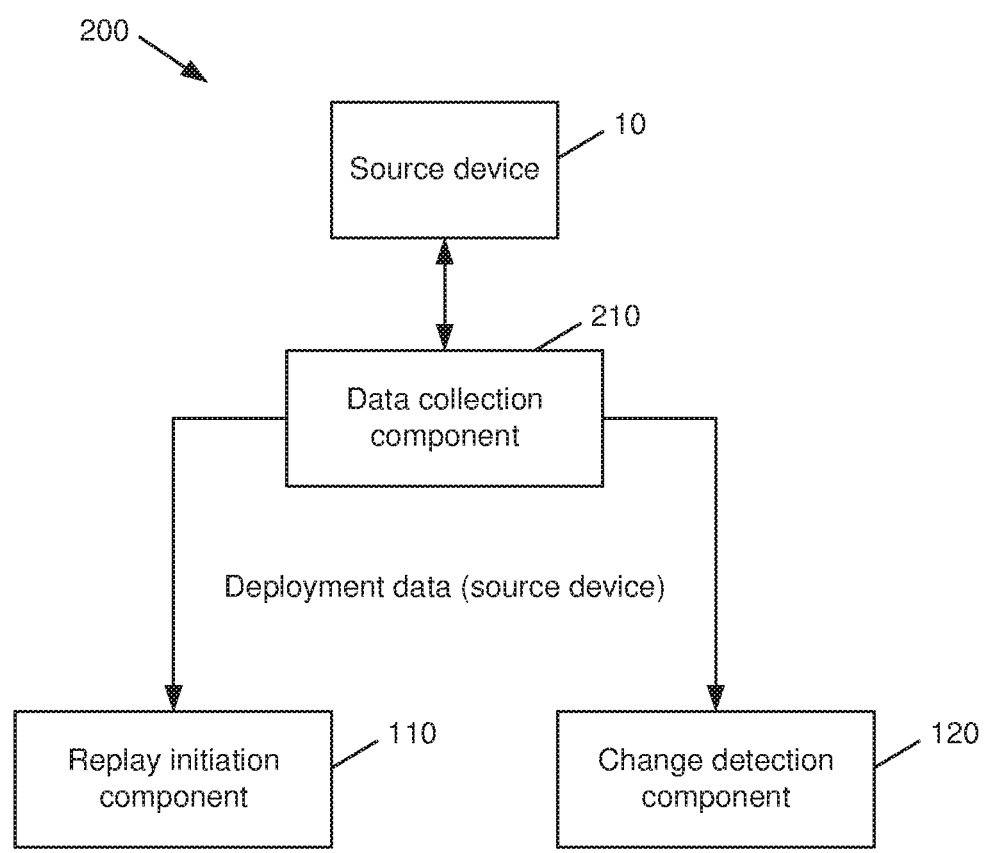
FIG. 2 is a block diagram of a system that facilitates collecting data related to a sequence of computer system configurations in accordance with various aspects described herein.

With reference next to FIG. 2, a block diagram of a system 200 that facilitates collecting data related to a sequence of computer system configurations in accordance with various aspects described herein is illustrated. Repetitive description of like elements employed in other embodiments described herein is omitted for brevity. As shown in FIG. 2, system 200 can include a data collection component 210 that can be utilized to gather and/or otherwise obtain configuration data, e.g., configuration data corresponding to a sequence of configurations as used by the replay initiation component 110 and/or change detection component 120, from a source device 10. This data can include, but is not limited to, physical configuration data associated with the source device 10, software configuration data associated with software utilized by the source device 10, environmental interaction data associated with the source device 10, and/or other suitable types of information.

Figure 3:
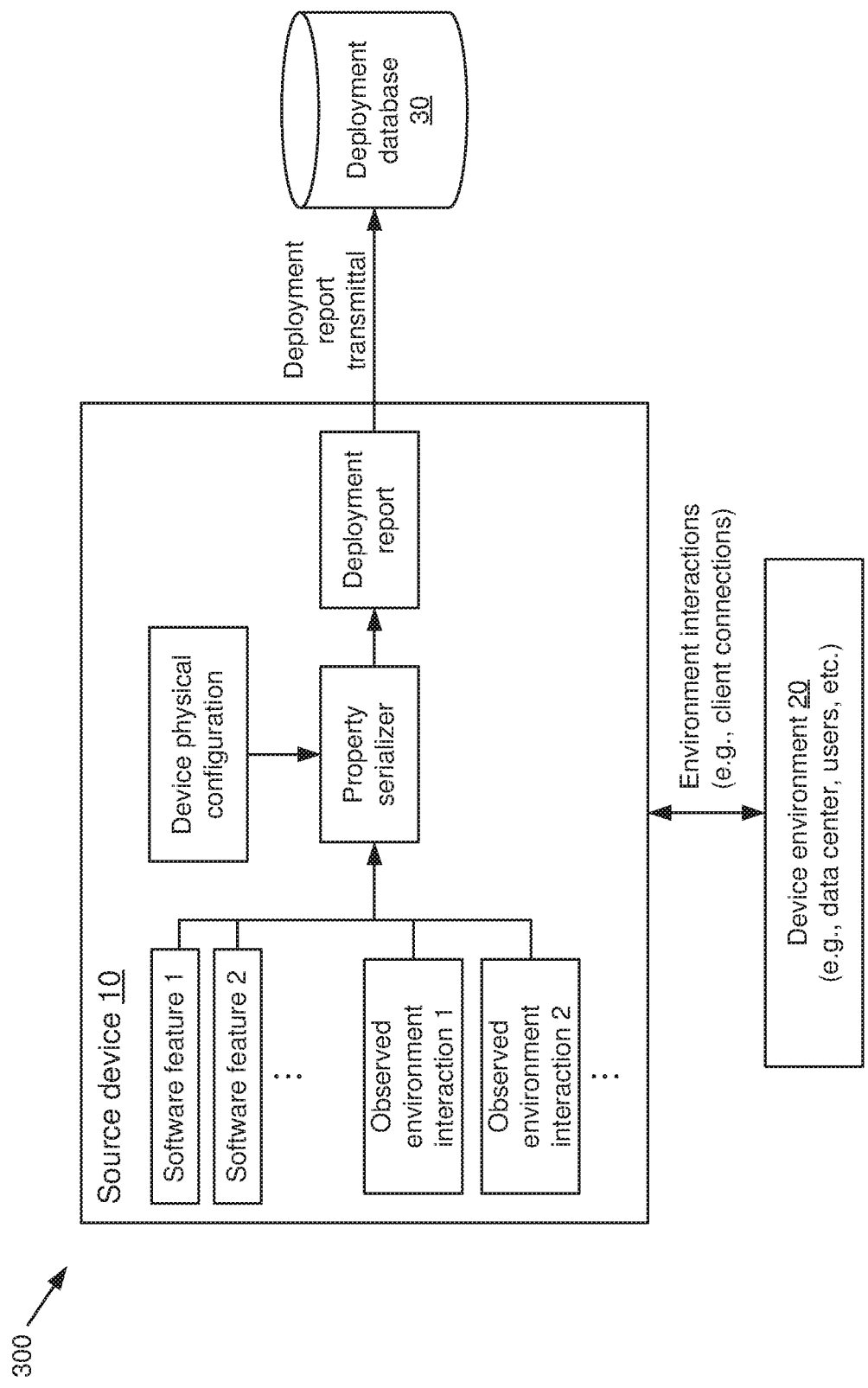
FIG. 3 is a diagram depicting an example model that can be utilized for collecting computer system deployment data in accordance with various aspects described herein.

A specific, non-limiting example of data collection that can be performed by the data collection component 210 from the source device 10 is illustrated by diagram 300 in FIG. 3. As noted above, the source device 10 can be, e.g., a physical device that is manufactured by a system developer and purchased by a given customer, which can additionally run software created and/or supported by the system developer. Alternatively, the source device 10 can be a customer-supplied device that runs software associated with the system developer. It should be appreciated, however, that the techniques described herein can be utilized for a source device 10 that is owned and/or operated by any appropriate entity.

In an aspect, various forms of information regarding the deployment configuration of the source device 10 can be collected to facilitate re-creation of that configuration, e.g., at a test site associated with the target device 12. Further, collection of data as described herein can be performed according to a pre-existing agreement between an operator of the source device 10 and a system testing entity, e.g., through a purchase or license agreement for the source device 10 or its software, and/or pursuant to any other means by which the operator of the source device 10 can provide affirmative consent to data collection.

Diagram 300 illustrates the various forms of deployment information that can be collected, e.g., so that the configuration of the source device 10 can be recreated at a mock site. This information can include, but is not limited to, the following:

1) The physical configuration of the source device 10 to be modeled, which can include factors such as drive types, node counts, or the like.

2) The configuration of the software features of the source device 10. By way of non-limiting example, this can include whether inline compression is enabled at the source device 10 and, if so, the compression algorithm(s) used for the compression.

3) Information about the environment 20 of the source device 10 and interactions between the source device 10 and its environment 20, such as client input/output (I/O) activity, external authentication, networking information, or the like.

In an aspect, collection of the above and/or other data relating to the source device 10 and its environment 20 can be provided via an application telemetry system at the source device 10, which can then transmit the data to the data collection component 210 as described above according to any suitable wired and/or wireless communication technologies. As additionally shown by diagram 300, deployment information can be serialized so that it can be transmitted, e.g., as a deployment report, from the source device 10 to the data collection component 210 within one or more communication signals. Once received by the data collection component 210, deployment information can be stored in a deployment database 30 and/or another suitable data structure for later retrieval and processing.

Deployment configuration data can be collected from a source device 10 in any suitable manner. For instance, deployment information can be collected periodically, e.g., according to a specified cadence or time interval. Also or alternatively, deployment information can be collected in response to occurrence of a triggering event. As an example, deployment information can be collected at specified points during the process of investigating issues with the deployment of the source device 10. Other schedules and/or events for collecting information could also be used. Additionally, deployment information can be collected and/or transmitted using any suitable telemetry techniques, including those presently existing or developed in the future. An example set of telemetry gathers that can be obtained from a source device 10 is described in further detail below with respect to FIGS. 4-5.

In an aspect, in order to facilitate the collection and organization of multiple telemetry reports from the source device 10, e.g., at different points in time, each deployment report and/or other quantum of deployment information collected from the source device 10 can contain a timestamp or other unique identifier. For instance, a deployment report can be assigned a key that includes a customer identifier associated with the source device 10, a cluster globally unique identifier (GUID) associated with the source device, a timestamp, and/or any other suitable information.

Figure 4:
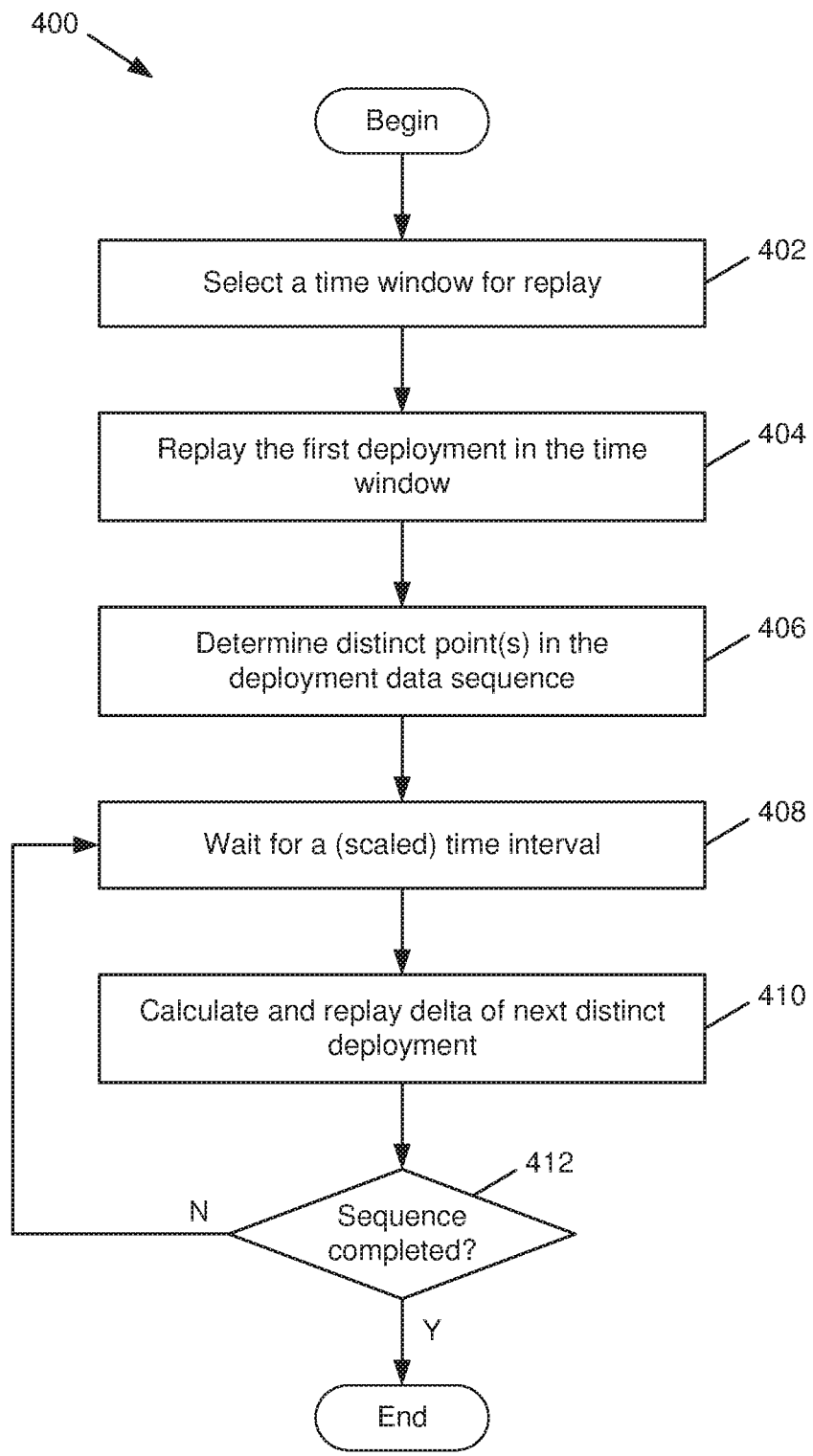
FIG. 4 is a flow diagram of an example method that can be used for accelerated replay of computer system configuration sequences in accordance with various aspects described herein.

Referring now to FIG. 4, a flow diagram of an example method 400 that can be used (e.g., by the components 110, 120, 130 of system 100 as shown in FIG. 1) for accelerated replay of computer system configuration sequences is illustrated. Method 400 as shown in FIG. 4 begins at 402, at which a time window for the replay is selected and/or otherwise configured. In an aspect, a time window for replay can be selected manually at 402, e.g., by a human tester according to the parameters of the desired test(s). By way of example, for a software upgrade test, a time window can be selected at 402 corresponding to a timeframe over which the given source device 10 underwent software upgrades of interest. As a more specific example, if a source device 10 underwent two major software updates with some patches applied between those major upgrades, a tester can select all of the deployment data in the relevant range at 402.

While the above description relates to manual selection of a time window at 402, other approaches could also be used. For instance, the time window can be selected at 402 in an automated manner, e.g., by the replay initiation component 110 of system 100 and/or other suitable component(s), based on known testing parameters or other information.

Next, at 404, the first deployment in the time window selected at 402 can be replayed, e.g., by the replay initiation component 110 as described above with respect to FIG. 1. In an aspect, the first deployment can be replayed at 404 according to any suitable techniques for replaying a computing system deployment, whether presently existing or developed in the future.

Figure 5:
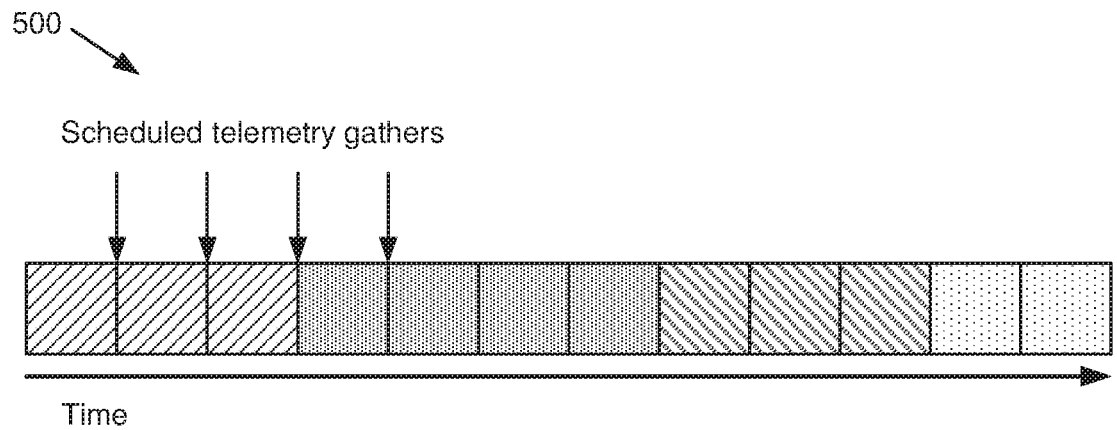
FIGS. 5-6 are diagrams depicting example time windows that can be utilized for accelerated replay of computer system configuration sequences in accordance with various aspects described herein.

At 406, one or more distinct points in the deployment data sequence (e.g., a sequence of configurations obtained by the data collection component 210 of system 200 within the time window selected at 402) can be determined, e.g., by the change detection component 120. By way of illustrative example, diagram 500 in FIG. 5 shows a series of telemetry gathers for a given source device 10 over a time period, e.g., a time window as selected at 402. In an aspect, the telemetry gathers are obtained (e.g., by the data collection component 210) according to a defined schedule. For instance, telemetry can be gathered from a source device 10 at intervals of a given period via a cron job and/or other scheduled task running at the source device 10.

In an aspect, the change detection component 120 can determine whether changes in configuration data, e.g., changes from one telemetry gather to the next, correspond to changes in configuration that are of interest for replaying. As an example, to facilitate a test case involving a specific upgrade and/or patch test scenario, it can be desirable to run tests for a realistic upgrade path and patch set. As a result, the change detection component 120 can discard one or more unrelated details of the deployment changing over time. In this case, the change detection component 120 can utilize a notion of "distinct" at 406 to identify points in the deployment data sequence that indicate changes in relevant software versions. Other techniques for filtering and/or isolating relevant properties of a configuration data sequence are described in further detail below with respect to FIGS. 8-9.

Figure 6:
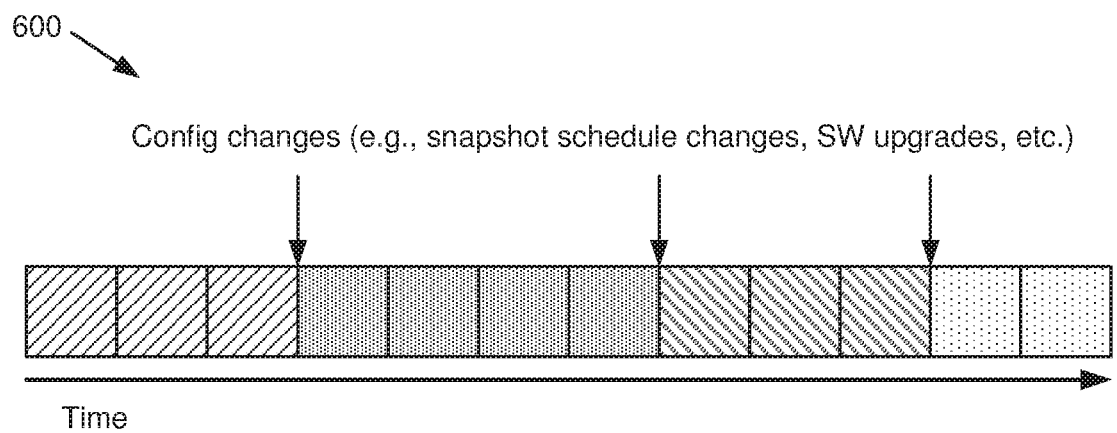

In another aspect, the change detection component 120 can determine distinct points in the deployment data sequence at 406 using any suitable techniques for calculating distinction between data points, whether presently existing or developed in the future, according to any appropriate definition of distinctiveness (e.g., such as that described above). As a result of the actions performed at 406, the change detection component 120 can output an array and/or other grouping of the data gathers shown in diagram 500 where distinct changes in the deployment were first observed. As further shown by diagram 600 in FIG. 6, the points in the data sequence corresponding to configuration changes are indicated with changes in shading, and the arrows point to the first telemetry gather where the respective distinct changes in deployments are observed. In an aspect, the change detection component 120 can provide as output at 406 the array of gather identifiers (e.g., a cluster GUID, timestamp, and/or other identifying information as described above) of the relevant data gathers.

Returning to FIG. 4, method 400 can proceed from 406 as described above to 408 to wait for a scaled time interval before altering the configuration of the target device 12 according to the distinct points identified at 406. In an aspect, scaling at 408 can be based on a target time for a test run of the target device 12, referred to herein as $T_{target}$, and an amount of elapsed time between the first and last deployment data points in the sequence processed at 406, referred to herein as $T_{actual}$. As described above with respect to FIGS. 5-6, the deployment data points can be collected within the relevant time window at regular intervals, e.g., intervals of a first period.

Figure 7:
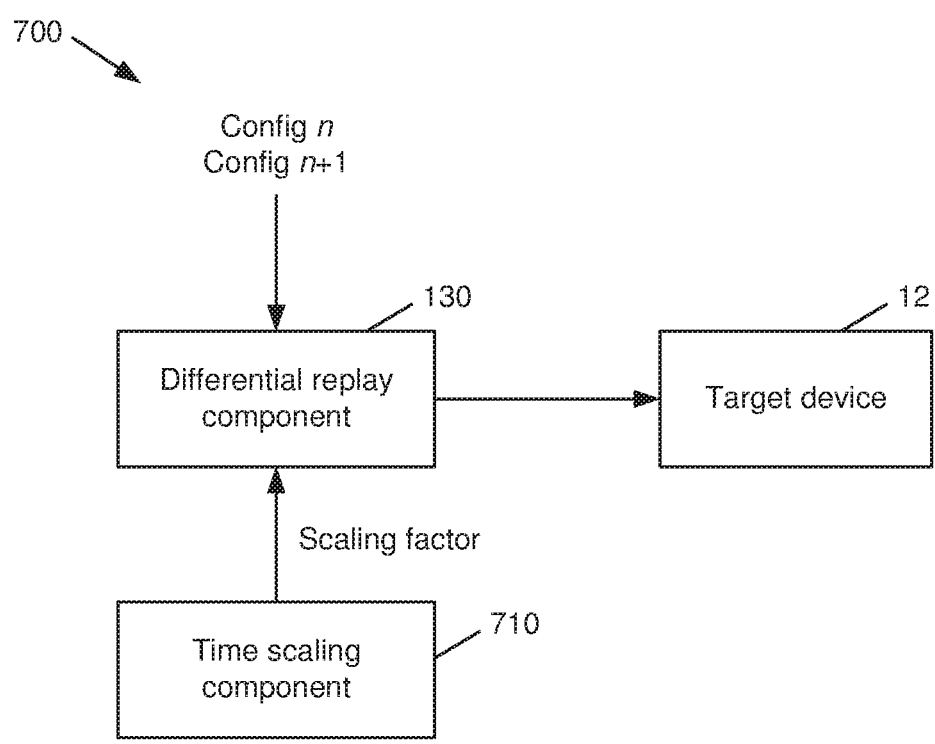
FIG. 7 is a block diagram of a system that facilitates temporal scaling of collected computer system deployment data in accordance with various aspects described herein.

Turning to FIG. 7, and with further reference to FIG. 4, a block diagram of a system 700 that facilitates temporal scaling of collected computer system deployment data in accordance with various aspects described herein is illustrated. Repetitive description of like elements employed in other embodiments described herein is omitted for brevity. System 700 as shown in FIG. 7 includes a time scaling component 710, which can modify the intervals of the first period at which the configuration data was collected from the source device 10 according to a scaling factor, resulting in second intervals of a second, distinct period.

To state the above another way, the time scaling component 710 can define a scaling factor S in order to perform a linear rescale of the time between deployment replays, e.g., as described above, such that the total time to replay the sequence equals $T_{target}$. Thus, for example, if the observed time interval between two distinct deployments corresponding to configurations n and n+1, respectively, is $t_{n+1}-t_n$, the time scaling component 710 can utilize the scaling factor S to scale the time interval as a function of a total time period associated with the configuration sequence and a simulation length assigned to the target device 12 as follows:

$$S=T_{target}/T_{actual}$$

$$t_{interval}=S*(t_{n+1}-t_n)$$

In response to the time scaling component 710 calculating this interval, the differential replay component 130 can wait for that length of time after replaying configuration n and before replaying configuration n+1. By way of the example configuration sequence shown in diagram 600, the differential replay component 130 can determine an amount of first intervals between distinct configurations and wait an equal amount of the second intervals as described above according to the scaling factor.

Upon waiting for a scaled time interval as shown at 408, method 400 as shown in FIG. 4 can proceed to 410, where the differential replay component 130 can calculate and replay a delta (differential) of the next observed distinct deployment, e.g., as shown in diagram 600. In an aspect, a delta can be applied to a target device 12 using techniques that are similar to those used to perform the original configuration change(s) to the source device 10. For instance, in the case of an upgrade test, a delta can correspond to new software versions, and replaying the delta can include performing the relevant software upgrades on the target device 12.

In an aspect, a delta can also or alternatively be applied by the differential replay component 130 at 410 using similar logic to the initial replay performed by the replay initiation component 110 at 404. By way of example, the differential replay component 130 can identify a set of deployment variables that represent the desired end state of the target device 12 (e.g., a state of the target device 12 after the delta is applied). From these variables, the differential replay component 130 can calculate appropriate automation for affecting that end state, given the state of the target device 12 prior to the delta. Returning to the upgrade test example above, a deployment variable can be used to indicate the new software version, which can then be utilized to facilitate automation that performs an upgrade on the target device 12 to the new software version.

Once a delta has been applied at 410, method 400 can proceed to 412 to determine whether there are more distinct deployments in the deployment data sequence for replay. If the sequence is complete, method 400 can conclude following 412. Otherwise, method 400 can repeat steps 408 and 410 as described above for respective additional deployments represented in the sequence. Thus, for example, in the event that the deployment data sequence also contains a third distinct configuration, the differential replay component 130 can obtain and apply a second delta (differential) to the target device 12 at 410 after waiting for the appropriate scaled time interval at 408. Processing in this manner can then continue for each distinct deployment represented in the sequence.

Figure 8:
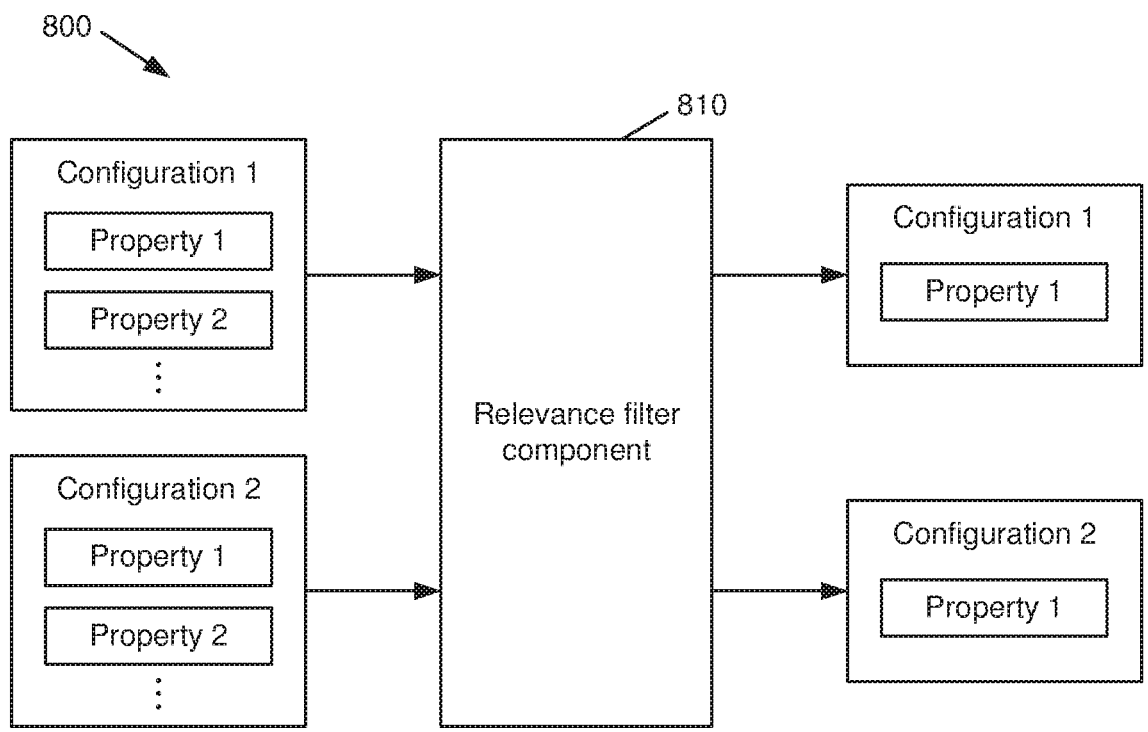
FIG. 8 is a block diagram of a system that facilitates filtering collected computer system deployment data according to relevance in accordance with various aspects described herein.

As noted above, configuration data can be filtered and/or otherwise processed in various manners in order to facilitate replay of selected aspects of a deployment change. Respective examples of filters that can be employed for configuration data are given by FIGS. 8-9. Referring first to FIG. 8, a block diagram of a system 800 that facilitates filtering collected computer system deployment data according to relevance in accordance with various aspects described herein is illustrated. Repetitive description of like elements employed in other embodiments described herein is omitted for brevity. System 800 as shown in FIG. 8 includes a relevance filter component 810, which can identify one or more selected properties of a sequence of configurations and remove one or more non-selected properties from the sequence of configurations, resulting in a sequence of filtered configurations.

In the example shown in FIG. 8, the relevance filter component can select a first property of respective configurations in a sequence and remove other properties from the corresponding configuration data, e.g., based on relevance of those properties to a test scenario. While only two configurations are shown in FIG. 8 as part of the sequence, it should be appreciated that any suitable number of configurations could be processed by the relevance filter component 810 in the same manner.

In an aspect, the relevance filter component 810 can be utilized to filter a sequence of configurations such that only deployment variables representing changes that relate to a defined test scenario are kept. A non-limiting set of examples of filters the relevance filter component 810 can employ are as follows:

1) For a test scenario designed to model operating system software upgrade paths seen in the field but with custom load and configuration changes, the relevance filter component 810 can be utilized to isolate the operating system software upgrades in the configuration data.

2) For a test scenario designed to model all software configuration changes but ignore physical configuration changes (e.g., scale out, etc.), the relevance filter component 810 can remove physical configuration changes to facilitate recreation of a deployment on a fixed-size cluster.

3) The relevance filter component 810 can keep only changes in client load statistics in order to simulate, e.g., burstiness of load. This can also be used in combination with statistical filtering as described below with respect to FIG. 9.

Other examples are also possible.

Figure 9:
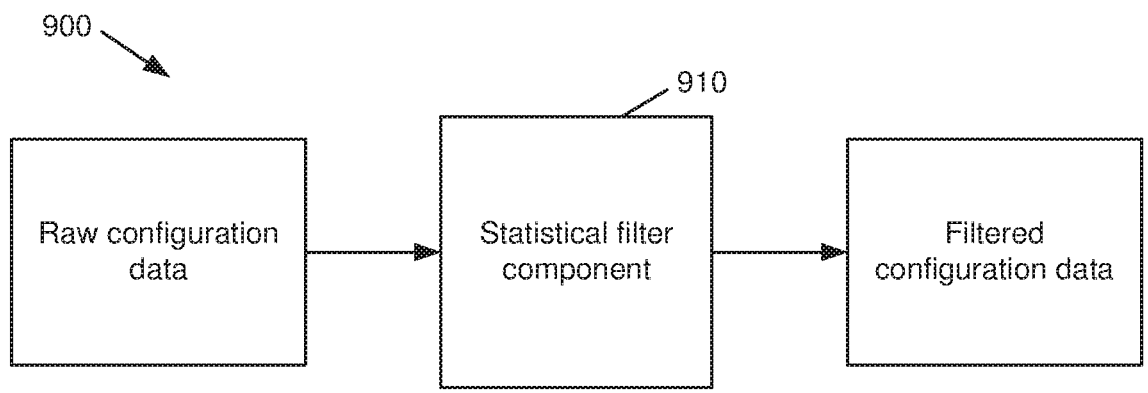
FIG. 9 is a block diagram of a system that facilitates statistical filtering of collected computer system deployment data in accordance with various aspects described herein.

Turning now to FIG. 9, a block diagram of a system 900 that facilitates statistical filtering of collected computer system deployment data in accordance with various aspects described herein is illustrated. Repetitive description of like elements employed in other embodiments described herein is omitted for brevity. System 900 as shown in FIG. 9 includes a statistical filter component 910 that can remove stochastic variation from a sequence of configurations to provide a sequence of filtered configurations. As used herein, the term "stochastic" refers to variation that can be attributed to sampling error and/or other statistically insignificant causes. For instance, for stochastic processes, samples can vary with time without representing an actual change in the underlying process to be modeled, and the statistical filter component 910 can remove this variation from raw configuration data to provide more relevant test data, e.g., to the change detection component 120 and/or differential replay component 130.

Using client load as an example of the above, respective clients associated with a target device 12 can be modeled with load summary statistics, and those statistics can vary from moment to moment despite the underlying load being comparatively stable. In these cases, the statistical filter component 910 can be configured to statistically test the configuration data sequence for structural breaks, e.g., changes that are determined by the statistical filter component 910 to be actual changes in the underlying load as opposed to random variation. To this end, the statistical filter component 910 can observe changes in the use of a source device 10, e.g., in terms of load amounts, number of clients connected, etc., to identify properties in the data such as periodicity and burstiness and to ignore simple sampling error.

In an aspect, the statistical filter component 910 can apply similar filtering logic to file statistics, such as file counts and sizes and/or other properties. For instance, if file counts are observed to exhibit growth at a relatively constant rate and/or growth according to a logarithmic function, appropriate models can be used to simulate client load. In the event that the statistical filter component 910 determines that this growth model is no longer appropriate, then a new model estimate can be made and pushed to the differential replay component 130 and/or other suitable components.

Figure 10:
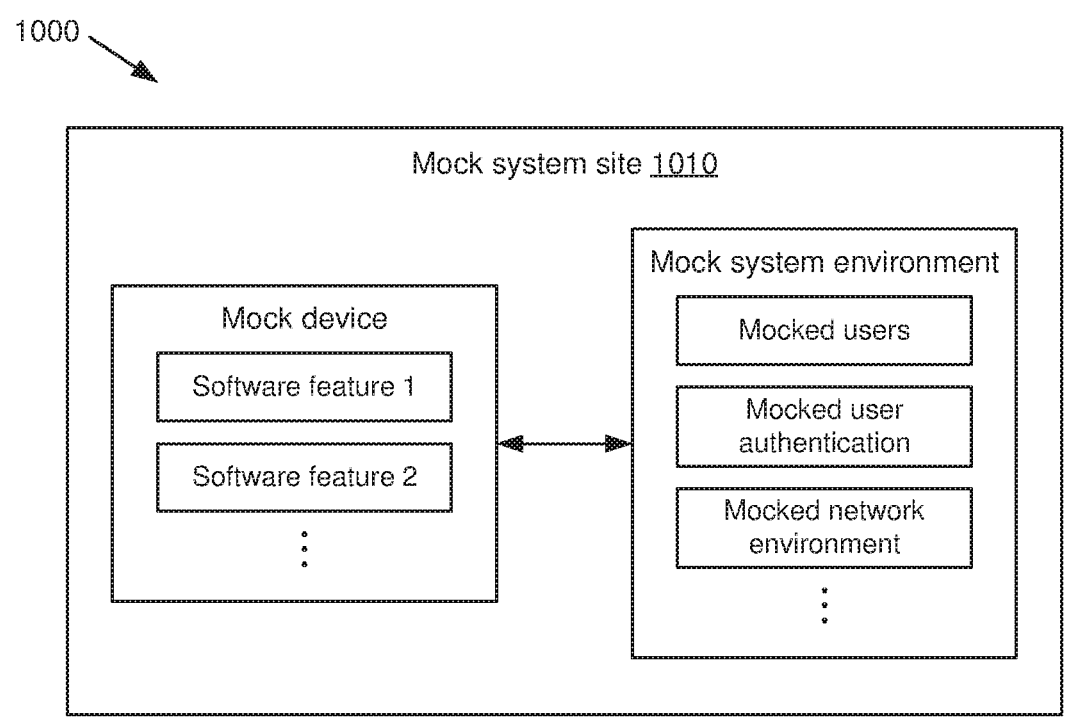
FIG. 10 is a diagram depicting an example mock system site that can be utilized for configuration replay in accordance with various aspects described herein.

With reference now to FIG. 10, diagram 1000 illustrates an example mock system site 1010 that can be utilized to recreate a computing system deployment, e.g., a deployment represented by data stored in a deployment database 30. As shown by diagram 1000, the mock system site 1010 can include one or more mock devices (e.g., computing clusters) as well as a mock system environment. In an aspect, the mock device can be configured with one or more software features and/or other properties, e.g., as generally described above. Further, the mock system environment can include recreated properties of the original source device, such as system users, authentication data associated with those users, a network environment associated with the mock device, etc. Other aspects of the target device and its environment can also be created via the mock system site 1010.

Figure 11:
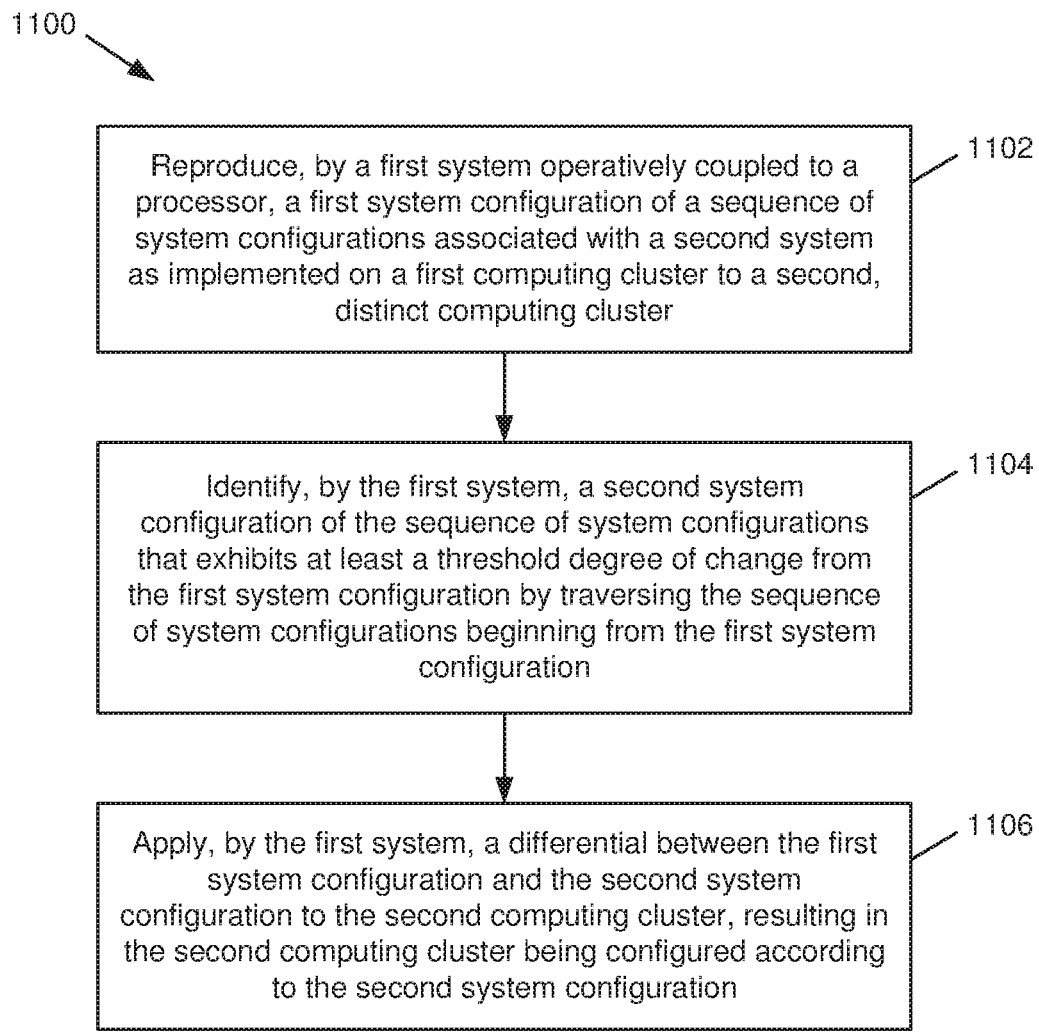
FIG. 11 is a flow diagram of a method that facilitates accelerated replay of computer system configuration sequences in accordance with various aspects described herein.

Referring next to FIG. 11, a flow diagram of a method 1100 that facilitates a flow diagram of a method that facilitates accelerated replay of computer system configuration sequences in accordance with various aspects described herein is illustrated. At 1102, a first system operatively coupled to a processor can reproduce (e.g., by a replay initiation component 110) a first system configuration of a sequence of system configurations associated with a second system as implemented on a first computing cluster (e.g., a source device 10) to a second, distinct computing cluster (e.g., a target device 12).

At 1104, the first system can identify (e.g., by a change detection component 120) a second system configuration of the sequence of system configurations that exhibits at least a threshold degree of change from the first system configuration reproduced at 1102 by traversing the sequence of system configurations beginning from the first system configuration.

At 1106, the first system can apply (e.g., by a differential replay component 130) a differential (delta) between the first system configuration reproduced at 1102 and the second system configuration identified at 1104 to the second computing cluster, resulting in the second computing cluster being configured according to the second system configuration.

FIGS. 4 and 11 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
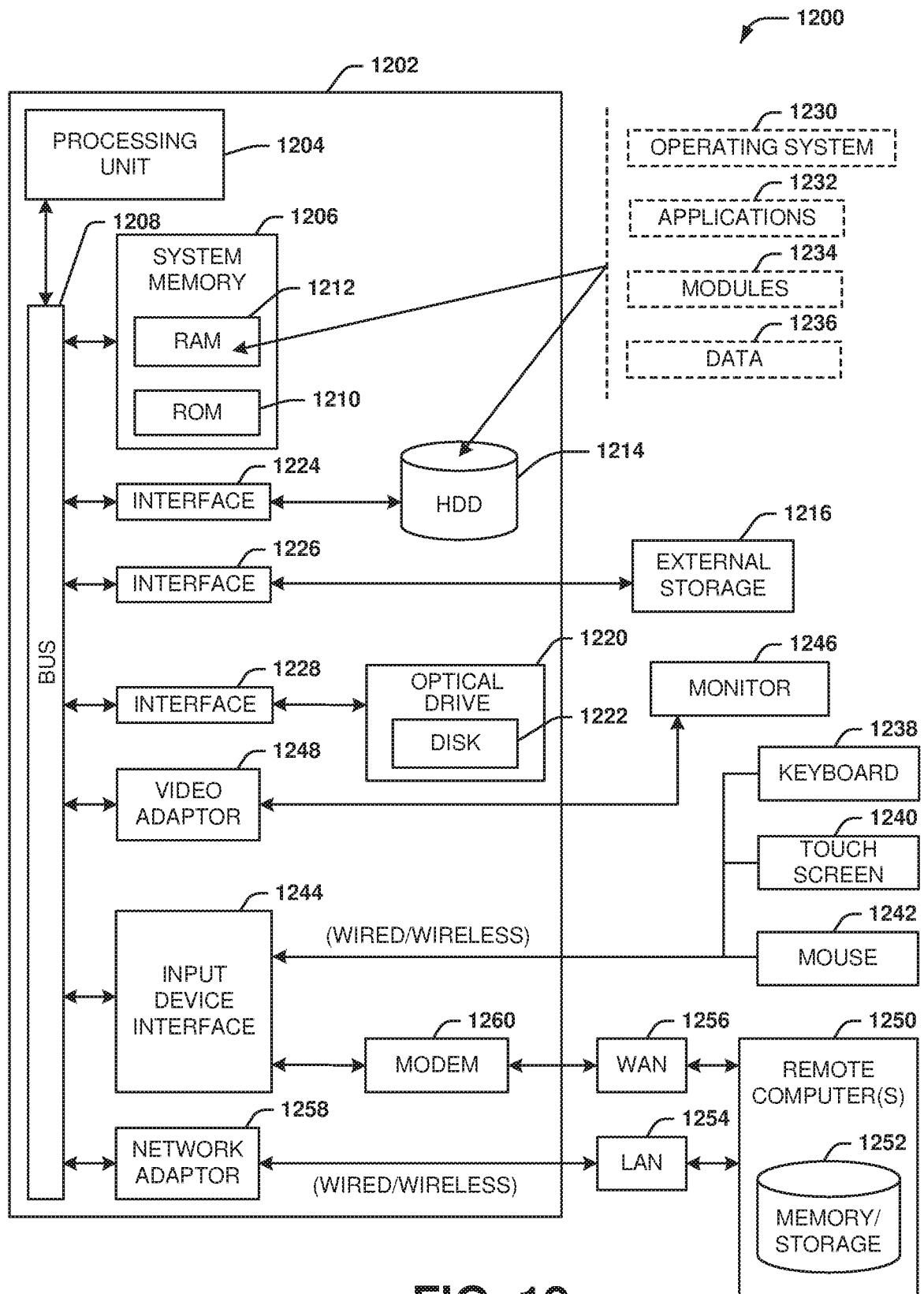
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory that stores executable components; and
   a processor that executes the executable components stored in the memory, wherein the executable components comprise:
   a replay initiation component that reproduces a first configuration of a sequence of configurations associated with a computing system as implemented on a first computing cluster to a second computing cluster that is distinct from the first computing cluster;
   a change detection component that identifies a second configuration of the sequence of configurations that exhibits at least a threshold degree of change from the first configuration by traversing the sequence of configurations starting from the first configuration; and
   a differential replay component that applies a differential between the first configuration and the second configuration to the second computing cluster, resulting in the second computing cluster being configured according to the second configuration.

2. The system of claim 1, wherein the executable components further comprise:
   a data collection component that obtains respective ones of the sequence of configurations from the first computing cluster at intervals of a first period.

3. The system of claim 2, wherein the intervals are first intervals, and wherein the executable components further comprise:
   a time scaling component that modifies the first intervals of the first period according to a scaling factor, resulting in second intervals of a second period that is distinct from the first period.

4. The system of claim 3, wherein the differential replay component determines a first amount of the first intervals between the first configuration and the second configuration as implemented on the first computing cluster and applies the differential between the first configuration and the second configuration to the second computing cluster in response to passage of the first amount of the second intervals from the replay initiation component reproducing the first configuration to the second computing cluster.

5. The system of claim 3, wherein the scaling factor is a function of a total time period associated with the sequence of configurations and a simulation length associated with the second computing cluster.

6. The system of claim 1, wherein the executable components further comprise:
   a relevance filter component that identifies a selected property of the sequence of configurations and removes one or more non-selected properties from the sequence of configurations, resulting in a sequence of filtered configurations that respectively comprise the selected property, wherein the change detection component identifies the second configuration from the sequence of filtered configurations.

7. The system of claim 6, wherein the selected property comprises configuration data for a selected software feature associated with the computing system.

8. The system of claim 1, wherein the executable components further comprise:

a statistical filter component that removes stochastic variation from the sequence of configurations, resulting in a sequence of filtered configurations, wherein the change detection component identifies the second configuration from the sequence of filtered configurations.

9. The system of claim 1, wherein the differential is a first differential, wherein the change detection component further identifies a third configuration of the sequence of configurations that exhibits at least the threshold degree of change from the second configuration by traversing the sequence of configurations starting from the second configuration, and wherein the differential replay component further applies a second differential between the second configuration and the third configuration to the second computing cluster.

10. A method, comprising:
reproducing, by a first system operatively coupled to a processor, a first system configuration of a sequence of system configurations associated with a second system as implemented on a first computing cluster to a second computing cluster that is distinct from the first computing cluster;
identifying, by the first system, a second system configuration of the sequence of system configurations that exhibits at least a threshold degree of change from the first system configuration by traversing the sequence of system configurations beginning from the first system configuration; and
applying, by the first system, a differential between the first system configuration and the second system configuration to the second computing cluster, resulting in the second computing cluster being configured according to the second system configuration.

11. The method of claim 10, further comprising:
collecting, by the first system, respective ones of the sequence of system configurations from the first computing cluster at intervals of a first period.

12. The method of claim 11, wherein the intervals are first intervals, and wherein the method further comprises:
applying, by the first system, a scaling factor to the first intervals of the first period, resulting in second intervals of a second period that is distinct from the first period.

13. The method of claim 12, wherein applying the differential comprises:
determining a first amount of the first intervals between the first system configuration and the second system configuration as implemented on the first computing cluster; and
applying the differential in response to passage of the first amount of the second intervals starting from the reproducing.

14. The method of claim 10, wherein the identifying comprises identifying the second system configuration in response to a selected property of the second system configuration exhibiting at least the threshold degree of change from the selected property of the first system configuration.

15. The method of claim 10, wherein the differential is a first differential, and wherein the method further comprises:
identifying, by the first system, a third system configuration of the sequence of system configurations that exhibits at least the threshold degree of change from the second system configuration by traversing the sequence of system configurations starting from the second system configuration; and
applying, by the first system, a second differential between the second system configuration and the third system configuration to the second computing cluster.

16. A non-transitory machine-readable medium comprising executable instructions that, when executed by a processor, facilitate performance of operations, the operations comprising:
configuring a first computing cluster according to a first deployment configuration of a series of deployment configurations associated with a computing system as implemented on a second computing cluster that is distinct from the first computing cluster;
identifying a second deployment configuration of the sequence of deployment configurations that differs from the first deployment configuration by at least a threshold by traversing the sequence of deployment configurations beginning from the first deployment configuration; and
configuring the first computing cluster according to the second deployment configuration by applying a differential between the first deployment configuration and the second deployment configuration to the first computing cluster.

17. The non-transitory machine-readable medium of claim 16, wherein the operations further comprise:
collecting respective ones of the sequence of deployment configurations from the second computing cluster at first intervals of a first period.

18. The non-transitory machine-readable medium of claim 17, wherein the operations further comprise:
applying a scaling factor to the first intervals, resulting in second intervals of a second period that is distinct from the first period;
determining a first amount of the first intervals between the first deployment configuration and the second deployment configuration as implemented on the second computing cluster; and
configuring the first computing cluster according to the second deployment configuration in response to passage of the first amount of the second intervals from configuring the first computing cluster according to the first deployment configuration.

19. The non-transitory machine-readable medium of claim 16, wherein the operations further comprise:
identifying the second deployment configuration in response to a selected property of the second deployment configuration differing from the selected property of the first deployment configuration by at least the threshold.

20. The non-transitory machine-readable medium of claim 16, wherein the differential is a first differential, and wherein the operations further comprise:
identifying a third deployment configuration of the sequence of deployment configurations that differs from the second deployment configuration by at least the threshold by traversing the sequence of deployment configurations beginning from the second deployment configuration; and
configuring the first computing cluster according to the third deployment configuration by applying a second differential between the second deployment configuration and the third deployment configuration to the first computing cluster.

* * * * *